US009147126B2

(12) United States Patent
Robinson et al.

(10) Patent No.: US 9,147,126 B2
(45) Date of Patent: Sep. 29, 2015

(54) POST COMPRESSION DETECTION (POCODE)

(71) Applicant: RAYTHEON COMPANY, Waltham, MA (US)

(72) Inventors: Ian S. Robinson, El Segundo, CA (US); Bradley Flanders, Whittier, CA (US); Anthony Sommese, Port Jefferson, NY (US)

(73) Assignee: RAYTHEON COMPANY, Waltham, MA (US)

( * ) Notice: Subject to any disclaimer, the term of this patent is extended or adjusted under 35 U.S.C. 154(b) by 245 days.

(21) Appl. No.: 13/957,415

(22) Filed: Aug. 1, 2013

(65) Prior Publication Data
US 2015/0036941 A1 Feb. 5, 2015

(51) Int. Cl.
*G06K 9/62* (2006.01)
*G06K 9/00* (2006.01)

(52) U.S. Cl.
CPC ............ *G06K 9/6202* (2013.01); *G06K 9/0063* (2013.01); *G06K 2009/00644* (2013.01)

(58) Field of Classification Search
CPC ...................................................... G06K 9/62
USPC ....................................................... 382/218
See application file for complete search history.

(56) References Cited

U.S. PATENT DOCUMENTS

2010/0303371 A1* 12/2010 Robinson et al. ............. 382/254
2013/0129256 A1* 5/2013 Robinson et al. ............. 382/298
2014/0241633 A1* 8/2014 Flanders et al. .............. 382/191

FOREIGN PATENT DOCUMENTS

EP 2511680 A2 10/2012
EP 2597596 A2 5/2013

OTHER PUBLICATIONS

Is There a Best Hyperspectral Detection Algorithm? D. Manolakis, R. Lockwood, T. Cooley and J. Jacobson. 2009.*
Matched filters for multispectral point target detection. S. Buganim and S.R. Rotman. 2006.*
Anomaly Detection and Classification for Hyperspectral Imagery. Chein-I Chang and Shao-Shan Chiang. Jun. 2002.*
(Continued)

*Primary Examiner* — Stephen R Koziol
*Assistant Examiner* — Delomia Gilliard
(74) *Attorney, Agent, or Firm* — Burns & Levinson LLP; Joseph M. Maraia

(57) ABSTRACT

Provided are examples of a detecting engine for identifying detections in compressed scene pixels. For a given compressed scene pixel having a set of M basis vector coefficients, set of N basis vectors, and code linking the M basis vector coefficients to the N basis vectors, the detecting engine reduces a spectral reference (S) to an N-dimensional spectral reference (SN) based on the set of N basis vectors. The detecting engine computes an N-dimensional spectral reference detection filter (SN*) from SN and the inverse of an N-dimensional scene covariance (CN). The detecting engine forms an M-dimensional spectral reference detection filter (SM*) from SN* based on the compression code and computes a detection filter score based on SM*. The detecting engine compares the score to a threshold and determines, based on the comparison, whether the material of interest is present in the given compressed scene pixel and is a detection.

9 Claims, 4 Drawing Sheets

(56) References Cited

OTHER PUBLICATIONS

Manolakis, D. et al. "Is There a Best Hyperspectral Detection Algorithm?." Algorithms and Technologies for Multispectral, Hyperspectral, and Ultraspectral Imagery XV. Ed. Sylvia S. Shen & Paul E. Lewis. Orlando, FL, USA: SPIE, 2009. 733402—16 pages. © 2009 SPIE—The International Society for Optical Engineering.

Manolakis et al., "Hyperspectral Image Processing for Automatic Target Detection Applications", The Lincoln Laboratory Journal, New York, NY, US, vol. 14, No. 1 Jan. 1, 2003, pp. 79-116.

Charles et al., "Learning Spares Codes for Hyperspectral Imagery", IEEE Journal of Selected Topics in Signal Processing, IEEE, US, vol. 5 No. 5 Sep. 1, 2011, pp. 963-978.

* cited by examiner

POST COMPRESSION DETECTION (POCODE)

BACKGROUND

This disclosure relates generally to the field of image processing, and more particularly to an approach for processing hyperspectral imaging data to detect targets while the data is in a highly compressed form.

In many conventional image processing scenarios comprising hyperspectral imaging (HSI) systems, hyperspectral sensors collect data of an image from one spatial line and disperse the spectrum across a perpendicular direction of the focal plane of the optics receiving the image. Thus, a focal plane pixel measures the intensity of a given spot on the ground in a specific waveband. A complete HSI cube scene is formed by scanning this spatial line across the scene that is imaged. The complete HSI cube may be analyzed as a measurement of the spectrum, the intensity in many wavebands, for a spatial pixel. This spatial pixel or "scene pixel" represents a given spot on the ground in a cross-scan direction for one of the lines at a given time in the scan direction.

Hyperspectral imaging data is large in size making it challenging to store and/or send. Typical data size is on the order of 0.1-1 GB per frame, and a frame can be collected in 1-4 seconds; so in a mission lasting many hours 1-10 TB of data can be collected on a mission. There are ways to compress the data into a smaller form making it easier to store and/or send. These data compression solutions, however, do not address the problem of detecting material of interests or targets in compressed hyperspectral imaging data.

Prior detection approaches include first decompressing a compressed scene pixel into an approximation of the original, full-dimensional scene pixel. And then comparing the scene pixel against spectral references (each representing a material of interest) using conventional spectral detection algorithms, such as Matched Filter (MF) Adaptive Cosine/Coherence Estimator (ACE), and to some extent, Reed-Xiaoli (RX) anomaly detection. Based on the comparison, a determination of whether the scene pixel contains a particular material of interest (or combination material of interests) is made (i.e., a detection).

Expanding a compressed scene pixel back into the original scene pixel adds steps to the detection process. These steps require additional computing resources and burden an already computationally intensive detection process. The non-literal nature of HSI requires many processing steps for every measured scene pixel in which the processing steps are often vector or matrix operations. Therefore, subsequent full-dimensional processing also requires more computations than reduced-dimension processing. Accordingly, there is a need to reduce the amount of processing needed to detect material of interests in hyperspectral imaging data that is in a highly compressed form.

In accordance with an example, a method for detecting materials in a hyperspectral scene containing a plurality of pixels is provided. The method includes, in a detecting engine provided with a spectral reference (S) and, for a given compressed scene pixel, a set of M basis vector coefficients, set of N basis vectors with M less than or equal to N, and code linking the M basis vector coefficients to the N basis vectors. The spectral reference (S) is representative of a material of interest. The method further includes reducing the spectral reference (S) to an N-dimensional spectral reference (SN) based on the set of N basis vectors. The method further includes computing an N-dimensional spectral reference detection filter (SN*) from the N-dimensional spectral reference (SN) and the inverse of an N-dimensional scene covariance (CN) of a hyperspectral scene in which the given compressed scene pixel is seen. The method further includes for each pixel, forming an M-dimensional spectral reference detection filter (SM*) by selecting M elements of the N-dimensional spectral reference detection filter (SN*) based on the code of the given compressed scene pixel linking the M basis vector coefficients to the N basis vectors. The method further includes computing a detection filter score for the given compressed scene pixel based on the M-dimensional spectral reference detection filter (SM*). The detection filter score being indicative of a likelihood the spectrum of the given compressed scene pixel matches the spectrum of the spectral reference (S). The method further includes comparing the detection filter score to a threshold and determining, based on the comparison, whether the material of interest is present in the given compressed scene pixel and is a detection.

In accordance with another example, a system for detecting materials in a hyperspectral scene containing a plurality of pixels is provided. The system includes memory having computer executable instructions thereupon and at least one interface receiving a spectral reference (S) representative of a materials of interest and, for a given compressed scene pixel, a set of M basis vector coefficients, a set of N basis vectors, and code linking the M basis vector coefficients to the N basis vectors. The system further includes a detecting engine coupled to the memory and the at least one interface. The computer executable instructions when executed by the detecting engine cause the detecting engine to reduce the spectral reference (S) to an N-dimensional spectral reference (SN) based on the set of N basis vectors. The detecting engine further caused to compute an N-dimensional spectral reference detection filter (SN*) from the N-dimensional spectral reference (SN) and the inverse of an N-dimensional scene covariance (CN) of a hyperspectral scene in which the given compressed scene pixel is seen. The detecting engine further caused to form an M-dimensional spectral reference detection filter (SM*) by selecting M elements of the N-dimensional spectral reference detection filter (SN*) based on the code of the given compressed scene pixel linking the M basis vector coefficients to the N basis vectors. The detecting engine further caused to compute a detection filter score for the given compressed scene pixel based on the M-dimensional spectral reference detection filter (SM*). The detection filter score being indicative of a likelihood the spectrum of the given compressed scene pixel matches the spectrum of the spectral reference (S). The detecting engine further caused to compare the detection filter score to a threshold and determine, based on the comparison, whether the material of interest is present in the given compressed scene pixel and is a detection.

In accordance with yet another example, a tangible computer-readable storage medium having computer readable instructions stored therein for detecting materials in a hyperspectral scene containing a plurality of pixels is provided. The computer readable instructions when executed by one or more processors cause the one or more processors, for a given compressed scene pixel having a set of M basis vector coefficients, a set of N basis vectors, and code linking the M basis vector coefficients to the N basis vectors, in which the value of M is less than or equal to the value of N, to reduce a spectral reference (S) to an N-dimensional spectral reference (SN) based on the set of N basis vectors, the spectral reference (S) representative of a materials of interest and provided to the detecting engine. The one or more processors further caused to compute an N-dimensional spectral reference detection filter (SN*) from the N-dimensional spectral reference (SN)

and the inverse of an N-dimensional scene covariance (CN) of a hyperspectral scene in which the given compressed scene pixel is seen. The one or more processors further caused to form an M-dimensional spectral reference detection filter (SM*) from the N-dimensional spectral reference detection filter (SN*) based on the code of the given compressed scene pixel linking the M basis vector coefficients to the N basis vectors. The one or more processors further caused to compute a detection filter score for the given compressed scene pixel based on the M-dimensional spectral reference detection filter (SM*), the detection filter score being indicative of a likelihood the spectrum of the given compressed scene pixel matches the spectrum of the spectral reference (S). The one or more processors further caused to compare the detection filter score to a threshold and determine, based on the comparison, whether the material of interest is present in the given compressed scene pixel and is a detection.

In some examples, any of the aspects above can include one or more of the following features.

In other examples of the method, computing the detection filter score includes computing a Matched Filter (MF) score in M dimensions for the given compressed scene pixel, or an Adaptive Cosine/Coherence Estimator (ACE) or Reed-Xiaoli (RX) filter score in M×N dimensions for the given compressed scene pixel.

In some examples of the method, the detection that is determined based on the comparison is a candidate detection and the method further includes computing a Matched Filter (MF), Adaptive Cosine/Coherence Estimator (ACE), other spectral filters or Reed-Xiaoli (RX) score in full dimensions or N dimensions for the candidate detection. The score being indicative of the likelihood that the spectrum of the candidate detection matches the spectrum of the spectral reference (S). The method further includes comparing the MF, ACE, other spectral filters or RX score in full dimensions or N dimensions to a second threshold and determining, based on the second comparison, whether the material of interest is present in the given compressed scene pixel and is a detection.

In other examples of the method, computing the detection filter score includes computing a Matched Filter score in M dimensions (MFM) for the given compressed scene pixel and the method further includes when the compressed scene pixel is a detection based on the comparison of the MFM to the threshold, computing a Adaptive Cosine/Coherence Estimator (ACE) or other spectral filters score in M or more dimensions, including full dimensions, for the compressed scene pixel. The method further includes comparing the ACE or other spectral filters score in M or more dimensions score to a second threshold, and determining, based on the second comparison, whether the material of interest is present in the given compressed scene pixel and is a detection.

In some examples of the method, computing the N-dimensional spectral reference detection filter (SN*) includes multiplying the N-dimensional spectral reference (SN) with the inverse of the N-dimensional scene covariance (CN).

In other examples of the method, forming the M-dimensional spectral reference detection filter (SM*) includes selecting M components from the N-dimensional spectral reference detection filter (SN*) based on the code linking M basis vector coefficients for the pixel to the N basis vectors.

The method further includes computing the N-dimensional scene covariance (CN) based on a set of N basis vector coefficients provided to the detecting engine and associated with the set of N basis vectors of the given compressed scene pixel These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

BRIEF DESCRIPTION OF THE DRAWINGS

The foregoing and other objects, features and advantages will be apparent from the following more particular description of the examples, as illustrated in the accompanying drawings in which like reference characters refer to the same parts throughout the different views. The drawings are not necessarily to scale, emphasis instead being placed upon illustrating the principles of the examples.

DETAILED DESCRIPTION

Figure 1:
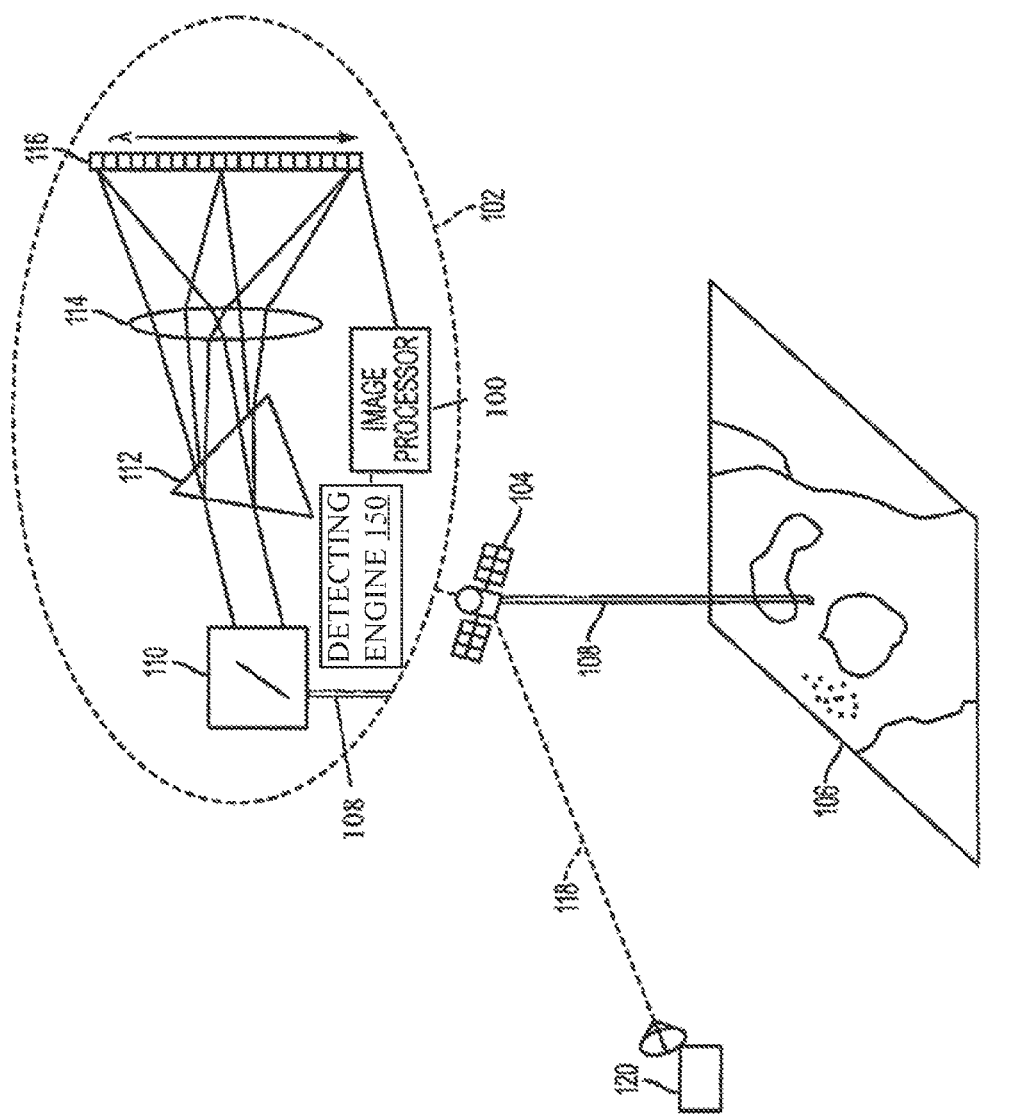
FIG. 1 is a block diagram of an example imaging system with a detecting engine.

In the description that follows, like components have been given the same reference numerals, regardless of whether they are shown in different examples. To illustrate an example (s) of the present disclosure in a clear and concise manner, the drawings may not necessarily be to scale and certain features may be shown in somewhat schematic form. Features that are described and/or illustrated with respect to one example may be used in the same way or in a similar way in one or more other examples and/or in combination with or instead of the features of the other examples.

Depicted in FIG. 1 is an example of imaging system 102 that is configured to process images and to detect materials/targets in backgrounds/scenes. By way of example only, imaging system 102 may be a hyperspectral imaging system. The term "hyperspectral" refers to imaging narrow spectral bands over a continuous spectral range, and producing the spectra of all pixels in a scene (e.g., scene 106). Imaging system 102 may be stationary or mobile, airborne or land based (e.g., on an elevated land structure or building), or may be on an aircraft or a satellite. As shown, imaging system 102 may incorporate image processor 100, and may be coupled to or otherwise contained within remote imaging system 104. Remote imaging system 104 may be of any suitable construction or configuration, including but not limited to comprising a satellite, an aerial surveillance system, or any other system that can capture images. Additionally, remote imaging system 104 may be stationary or mobile. In an example, imaging system 102 and remote imaging system 104 may be configured to capture one or more images of a particular scene 106 corresponding to a geographical area (e.g., a ground terrain).

In an example, remote imaging system 104 may be configured to use imaging system 102 to capture hyperspectral image(s) of scene 106 that are provided as input hyperspectral image scenes to image processor 100. In an example, hyperspectral imaging system 102 may include one or more scan mirrors 110, or may include other optics arranged to receive light 108 reflected from one or more ground resolution cells.

Light 108 reflected from one or more ground resolution cells, and generally the entire scene 106, may be used by image processor 100 to determine an input reflectivity of input HSI scene. Input HSI scene may be a part of scene 106, or may be the entire scene 106 depending upon specific target detection goals. In an example, scan mirrors 110 or the other optics may then direct light 108 through dispersing element 112, which may be arranged to separate light 108 into various different wavelengths (i.e., a spectra). After being separated into the various different wavelengths, light 108 may then be directed to one or more imaging optics 114, which may focus the various wavelengths onto a focal plane of detector array 116. As such, detector array 116 may capture hyperspectral data across the spectrum of wavelengths, thereby generating a data set corresponding to a hyperspectral image of scene 106. By way of example only, such a data set formed across the spectrum of wavelengths may be compressed as described by U.S. application Ser. No. 13/371,160, which is incorporated by reference in its entirety herein.

A brief discussion of examples of the compression process of U.S. application Ser. No. 13/371,160 will be helpful in understanding the detection process of the present application. The input to the compression process is a dimensionally reduced datacube consisting of a set of basis vectors, a datacube of basis vector coefficients, an error magnitude for each pixel, and some set aside pixels in full dimension. These set aside pixels are the pixels that could not be accurately represented as a linear combination of the set of basis vectors. By specifying an error threshold and setting aside pixels with error magnitudes greater than the specified threshold, the dimension reduction guarantees that every pixel has errors less than the threshold.

The compression process further reduces the size of the data, while maintaining the guarantee that every pixel has errors less than the threshold. It was observed that when the full set of basis vector coefficients are retained for every pixel, many of the pixels have errors much less than the error threshold and many of the pixels have numerous very small basis vector coefficients. The compression process uses a fast and computationally simplified technique to select the minimum number of basis vector coefficients necessary to reach the error criterion for each pixel, individually tailored to the spectrum of that pixel. Thus, when N basis vectors are used for the whole scene, the best M basis vectors are used on any particular pixel.

Because the set of basis vectors used varies for each pixel, the compression process tracks which coefficients are used for each pixel, in order to reconstitute an approximate dimension reduced datacube, with 0's for the small basis vector coefficients that are dropped by the compression process. The coefficients could also be used to reconstitute an approximate full dimension datacube by multiplying each retained coefficient by the appropriate basis vector. The foregoing coefficient tracking method results in a basis vector code for each pixel, either a binary (on/off) code per basis vector or an ordered list of utilized basis vectors. The basis vector code is used to properly associate each retained basis vector coefficient with the appropriate basis vector so the compressed data can be decompressed.

As shown, the imaging system 102 includes a detecting engine 150 for processing hyperspectral imaging data to detect targets while the data is in a highly compressed form, especially the form described in U.S. application Ser. No. 13/371,160. The terms "compressed hyperspectral imaging data," "compressed data," and "compressed scene pixel" are used interchangably herein.

As an overview, the detecting engine 150 and its examples compute a dimensionally reduced spectral reference and spectral reference detection filter. Then, on a per compressed scene pixel basis, compresses a spectral reference detection filter into a compressed spectral reference detection filter using the same information used to decompress the compressed scene pixel back into the original uncompressed pixel. The compressed spectral reference detection filter is representative of a material of interest or a target to be detected. The detecting engine 150 uses the compressed spectral reference detection filter to determine whether the material of interest is present in the compressed scene pixel. The following is a greater detailed discussion of the foregoing detection process.

Figure 2A:
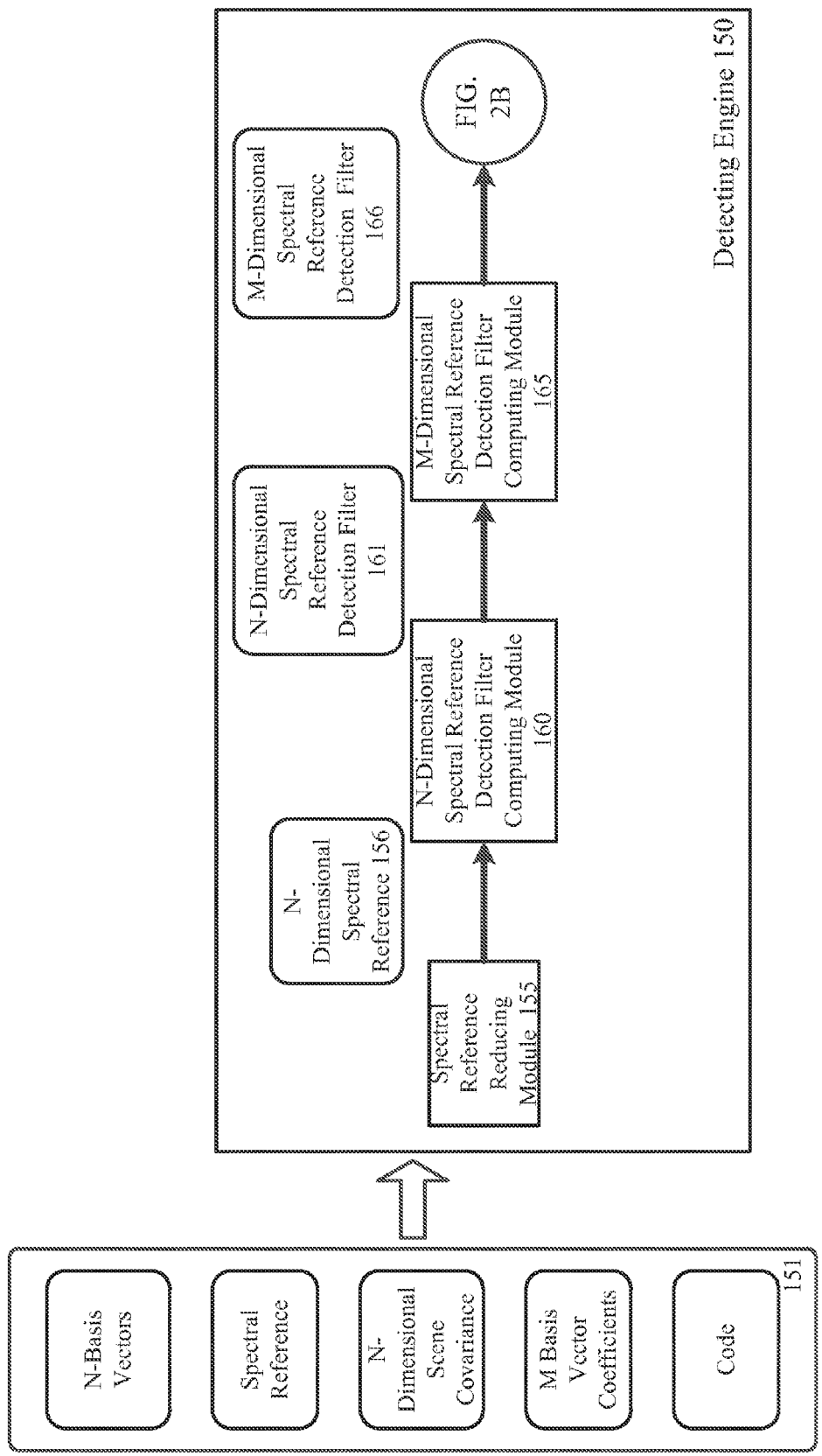
FIGS. 2A-B is a block diagram of an example of the detecting engine.
Figure 2B:
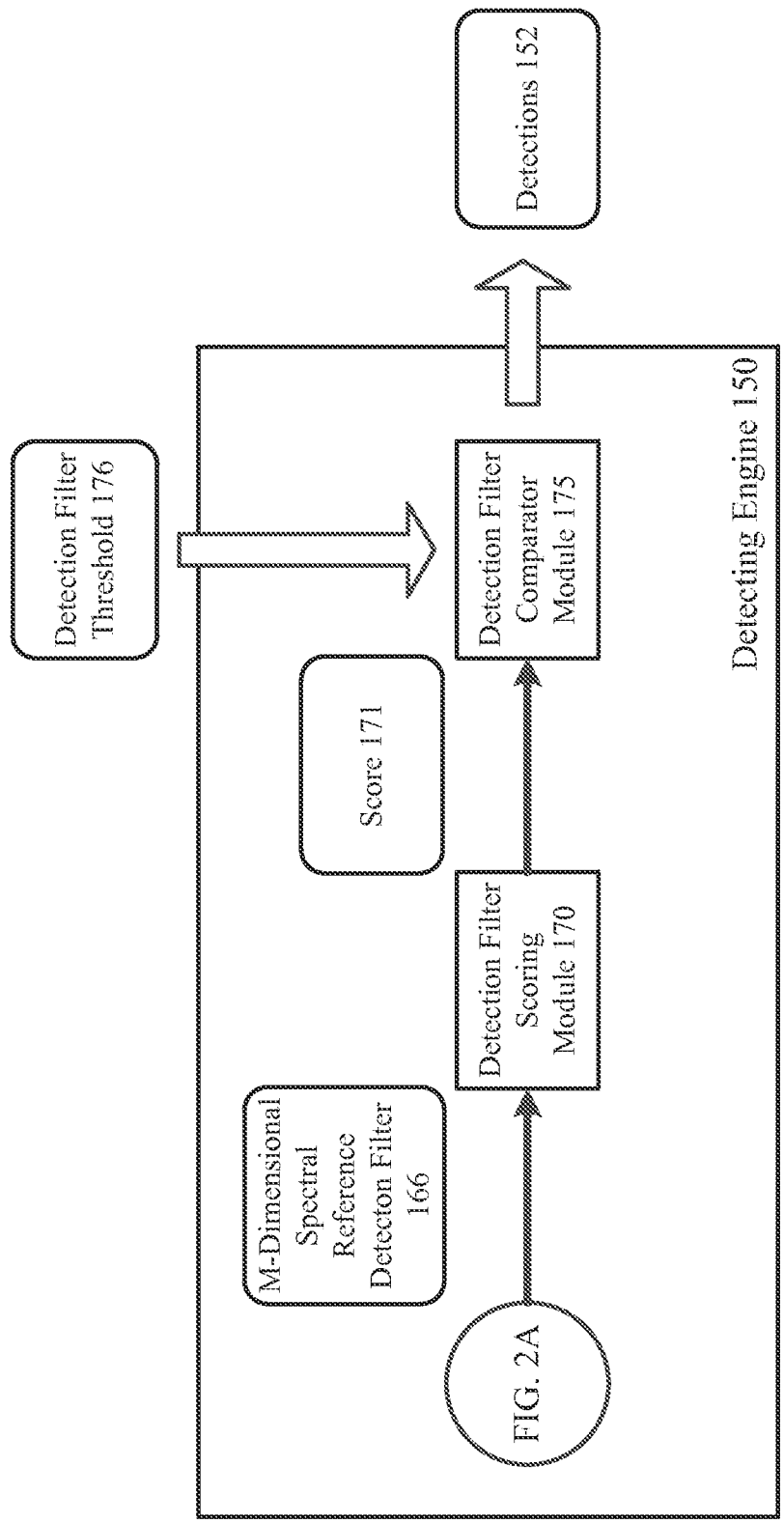

FIGS. 2A and 2B show an example of the detecting engine 150 for detecting the presence of materials of interest (or targets) in a plurality of compressed scene pixels of a hyperspectral scene. The detecting engine 150 includes a spectral reference reducing module 155, N-dimensional spectral reference detection filter computing module 160, M-dimensional spectral reference detection filter computing module 165, detection filter scoring module 170, and detection filter comparator module 175 communicatively coupled as shown in the figures. As shown, the detecting engine 150 is provided with input 151, which for a given compressed scene pixel includes a set of M basis vector coefficients, set of N basis vectors, and code linking the M basis vector coefficients to the N basis vectors. The value of M is less than or equal to the value of N.

For discussion purpose, the operation of the detecting engine 150 is described in context of detecting one material of interest or target in one compressed scene pixel. It should be understood that in practice the detecting engine 150 processes a plurality of compressed scene pixels making up a hyperspectral scene and a library of the spectral references representative of many material of interests. Thus, in practice, the detecting engine 150 compares each of the spectral references in compressed form to each of the compressed scene pixels to determine which materials are present in which compressed scene pixels.

Also provided as input 151 is a spectral reference (S). The spectral reference (S) is representative of a material of interest or target to be detected in the given compressed scene pixel. The spectral reference reducing module 155 reduces a number of dimensions (e.g., full dimensions) of the spectral reference to N dimensions based on the set of N basis vector of the given compressed scene pixel. The result of the spectral reference reducing module 155 is a dimensionally reduced spectral reference (SN) 156.

The N-dimensional spectral reference detection filter computing module 160 computes an N-dimensional spectral reference detection filter (SN*) 161 from the N-dimensional spectral reference (SN) 156 and the inverse of an N-dimensional scene covariance (CN). A scene covariance matrix represents the hyperspectral scene in which the given compressed scene pixel is seen. Some examples of the detecting engine 150 reduce the number of dimensions of a scene covariance matrix to N dimensions based on the set of N basis vector coefficients of the given compressed scene pixel. In a convenient example of the detecting engine 150, the N-dimensional spectral reference detection filter computing module 160 multiples the N-dimensional spectral reference (SN) 156 with the inverse of the N-dimensional scene covariance (CN) to create the N-dimensional spectral reference detection filter (SN*) 161.

The M-dimensional spectral reference detection filter computing module 165 reduces the N-dimensional spectral reference detection filter (SN*) 161 to an M-dimensional spectral reference detection filter (SM*) 166 appropriate for a specific scene pixel. The M-dimensional spectral reference detection filter (SM*) 166 is the spectral reference detection filter (SN*) compressed using the same information that would be used for decompressing that compressed scene pixel. The M-dimensional spectral reference detection filter (SM*) 166 is used to compute a spectral detection filter score in M dimensions, which is then used to detect the material of interest in that compressed scene pixel.

The compressed scene pixel has a code that may be used to decompress the compressed scene pixel, called a "compression basis vector utilization code" or simply "compression code." The compression code describes which M of N basis vector coefficients are used to represent a scene pixel during a compression process (such as the one described in U.S. application Ser. No. 13/371,160) resulting in a compressed scene pixel. The set of M basis vector coefficients varies from scene pixel to scene pixel. Consequently, the compression code also varies from compressed scene pixel to compressed scene pixel.

Rather than using the compression code associated with the compressed scene pixel to decompress the compressed scene pixel, the detecting engine 150 uses the compression code to compress the N-dimensional spectral reference detection filter (SN*) 161 into the M-dimensional spectral reference detection filter (SM*) 166 for that scene pixel. The reducing module uses the compression code to select the appropriate M elements from the full set of N elements of the N-dimensional spectral reference detection filter (SN*) 161 to form the M-dimensional spectral reference detection filter (SM*) 166. The M selected elements of the full N-dimensional spectral reference detection filter (SN*) 161 are the elements that multiply the non-zero basis vector coefficients of each pixel.

A convenient example of the detecting engine 150 computes the N-dimensional spectral reference detection filter (SN*) 161 which has also been described as a "kernel vector" The kernel vector is described in U.S. application Ser. No. 13/870,685, which is incorporated by reference in its entirety herein. In the context of the present application and examples of the detecting engine 150, the kernel vector provides the information needed for a direct and rapid evaluation of a spectral detection filter score 171 for any scene pixel.

As an overview, the detecting engine 150 selects the appropriate M elements of the N-dimensional spectral reference detection filter (SN*) 161 to create an M-dimensional spectral reference detection filter (SM*) 166 for each compressed scene pixel, which is different for every compressed scene pixel, using the compression code described above. For a given compressed scene pixel, the detecting engine 150 multiplies the M retained basis vector coefficients for the given compressed scene pixel, by the M elements of the spectral reference detection filter (SM*) 166 and then adds the terms, resulting in the M-dimensional spectral detection filter score 171. The M-dimension detection spectral filter is far more computational efficient than a full dimension matched filter or an N-dimensional detection filter score.

In more detail and with reference to the spectral detection filter equations below, the detecting engine 150 calculates, in N-dimensions, the kernel vector $\Sigma_b^{-1}(x-\mu_b)$, also referred to as the N-dimensional spectral reference detection filter (SN*) 161, for each spectral reference.

$$MF = \frac{(s-\mu_b)^T \sum_b^{-1} (x-\mu_b)}{(s-\mu_b)^T \sum_b^{-1} (s-\mu_b)}$$

$$ACE = \frac{\left[(s-\mu_b)^T \sum_b^{-1} (x-\mu_b)\right]^2}{(s-\mu_b)^T \sum_b^{-1} (s-\mu_b)(x-\mu_b)^T \sum_b^{-1} (x-\mu_b)}$$

$$RX = (x-\mu_b)^T \sum_b^{-1} (x-\mu_b)$$

where:
s=known target spectrum,
x=pixel spectrum,
$\mu_b$=mean background, and
$\Sigma_b$=covariance matrix When the detecting engine 150 uses the kernel vector $\Sigma_b^{-1}(x-\mu_b)$ to evaluate the Matched Filter or ACE numerator term, the detecting engine 150 computes a simple dot product of two vectors (viz. "vector-A" and "vector-B"). There are no cross-terms or other terms needed, just the M terms corresponding to the M basis vectors associated with a particular compressed scene pixel.

To evaluate the ACE denominator term (also RX), the detecting engine 150 uses N×M elements in the inverse of the N×N scene covariance matrix (CN) for each pixel. In carrying out the matrix multiplication of the inverse covariance with the compressed pixel vector on the right side, the detecting engine 150 uses the compression basis vector utilization code to select the appropriate M columns from the inverse of the scene covariance matrix (CN) corresponding to non-zero compressed pixel coefficients. The detecting engine 150 then evaluates the N rows of the multiplication to yield an N-dimensional vector kernel for each pixel. The detecting engine 150 then chooses the appropriate M elements from the vector kernel to multiply the M non-zero coefficients of the compressed pixel and calculate the ACE denominator/RX value for each pixel with an M-dimensional dot product. Thus the total multiplications (or additions) is MN+M; rather than NN+N for the N-dimensional calculation.

Because the detecting engine 150 uses only the M selected elements of the N-dimensional vector kernel, the detecting engine 150 does not need to calculate the other elements, and thus, reduces the workload of the detecting engine 150.

Continuing with FIGS. 2A and 2B, the detection filter scoring module 170 computes a spectral detection filter in a reduced space of M dimensions of the compressed M-dimensional spectral reference detection filter (SM*) 166 and the compressed M-dimensional scene pixel. One example of the detecting engine 150 computes a detection filter score for the given compressed scene pixel by multiplying the M basis vector coefficients by the selected M elements of the spectral reference detection filter (SM*) 166 and adding the terms. A resulting detection filter score 171 indicates the likelihood the spectrum of a scene pixel, which is represented by the compressed scene pixel, matches the spectrum of the spectral reference (S).

In a convenient example of the detecting engine 150, the detection filter scoring module 170 computes a Matched Filter in M dimensions (MFM). A resulting matched filter score is approximately the same as computed in N dimensions; in accordance with the incremental error introduced by compressing pixels to M dimensions. The benefit of approximating is that fewer calculations are done by using M dimensions rather than N (given that M is less than N for almost all pixels). In other examples, the detection filter scoring module 170 computes ACE, other spectral filters and/or RX in M×N dimensions as described above.

The detection filter comparator module 175 determines the presence of the material of interest in the compressed scene pixel by comparing the detection filter score 171 to a threshold 176, also referred to as "thresholding." In some examples, the threshold 176 (and any threshold described herein) can be provided, for example, during initialization of the detecting engine 150. The threshold 176 can be read from a configuration file, obtained by user input (e.g., using the front end interface described with reference to FIG. 1), determined from one or more features of the image, and combinations of one or more of such techniques. The magnitude of the threshold 176 can be selected with or without using the distribution of filter scores, or determined in relation to other features, such as the time of date a terrain was imaged, associated ground temperatures, or criticality application, e.g., detecting explosive is more critical than detecting vegetation.

Based on the thresholding described above, the detection filter comparator module 175 determines whether the material of interest is present in the compressed scene pixel and is a detection 152. The detecting engine 150 outputs the detection 152, which may be reported to the analysts or recorded for later analysis.

Other examples of the filtering engine 150 use the detection filter scores 171 to determine which compressed scene pixels should be re-tested using full dimensions (i.e., full waveband) or N dimensions Matched Filter (MF), Adaptive Cosine/Coherence Estimator (ACE) or other spectral detection filter. For example, the filtering engine 150 performs thresholding and determines that a score for a given compressed scene pixel is below a first threshold but above a second threshold. In other words, the given compressed scene pixel has a "medium" detection filter score. The probability that the material of interest is present in the scene pixel represented by the compressed scene pixel may be substantially equal or statistically equal to the probability that it is not present in the represented scene pixel. These compressed scene pixel may be called "candidate detections." The filtering engine 150 then scores these candidate detections using full of N dimensions MF, ACE or other spectral detection filter.

The foregoing "two-stage processing" is advantageous because applying a full dimensional spectral detection filter on a subset of compressed scene pixel, viz., those compressed scene pixels with medium detection filter scores, rather than on a complete set of compressed scene pixels, reduces the number of operations. Accordingly, a convenient example of the filtering engine 150 performing two stage processing on compressed scene pixels using M-dimensional detection filters followed by full or less sparse (e.g., N dimension) detection filters and selected candidate detections.

In another example of two-stage processing, the detecting engine 150 combines MF with ACE to improve detection capability. A false alarm for MF tends to be different then a false alarm for ACE. Because MF scales with the pixel "magnitude," MF false alarms tend to be pixels far from the mean spectrum. Because ACE is independent of pixel magnitude, due to the RX term in the denominator; ACE false alarms tend to be pixels near the mean spectrum (due to small RX values in the denominator).

A convenient example of the detecting engine 150 efficiently identifies detections while reducing the occurrences of "false" detections. Using the two stage processing described above, the detecting engine 150 first identifies pixels that are likely to be detections using MF. The detecting engine 150 them confirms whether these "likely" detections are "true" detections by performing additional ACE processing on the identified pixels. Because the "likely" detections will often be only a fraction of the compressed scene pixels, the example detecting engine 150 performs additional processing for that fraction of the compressed scene pixels. As such, by implementing two-stage processing, the example detecting engine 150 performs fewer operations than processing each of the compressed scene pixels with both MF and ACE.

In contrast, the conventional approach to detecting materials with ACE involves computing an ACE score for each pixel in the hyperspectral scene. A "flat" or constant threshold is then applied, individually, to each of the ACE scores to determine detection results. The conventional approach is very computationally intensive. A typical hyperspectral scene includes one million or more pixels. Computing an ACE score of each of these pixels and then thresholding these scores requires many operations. Current state-of-the-art detecting engines are taxed by the conventional approach. Furthermore, the conventional approach is inefficient because most scene pixels are not detections.

One of the advantages of the detecting engine 150 is that it thresholds both detection filter and coherence scores. Instead of calculating coherence scores of every pixel, as is typically done, the detecting engine 150 computes coherence scores for only those pixels that have a detection filter score above a nominal threshold, which indicates a potential target. The rationale is that coherence estimation is used in addition to "matched filtering" because it is less likely to report a high score in response to clutter, especially man-made clutter. A convenient example of the detecting engine 150 validates whether a high detection filter score is a real target or likely to be due to clutter by computing coherence score for pixels with modest detection filter scores. The foregoing is particularly advantageous in scenarios in which an enemy, for example, tries to hide a real target with false targets.

Advantageously, with fewer operations to perform, examples of the detecting engine 150 can be implemented in processors that are smaller in size, lighter in weight and/or use less power. Such detecting engines are ideal for remote imagining systems, like the one described with reference to FIG. 1.

Examples of the detecting engine 150 provide one or more of the following advantages: i) very rapid detection with low false alarms, especially if data already in DIMRED form, ii) very rapid detection with low false alarms, especially if data already in Compressed form, iii) detection of targets using compressed data, iv) detection of targets and materials in compressed data without decompression, v) detection of targets using ensembles of pixels with disparate compression basis vectors, vi) detection of targets in compressed data by whitening references in a higher dimension version of data and computing compressed spectral reference detection filters (e.g. with components selected to match each pixels selected components, vii) selection of a unique set of M of N components of the spectral reference detection filter for each pixel and then matching the M components of the pixel on a per pixel basis, viii) reducing computations 2-4× beyond prior dimension reduction.

Figure 3:
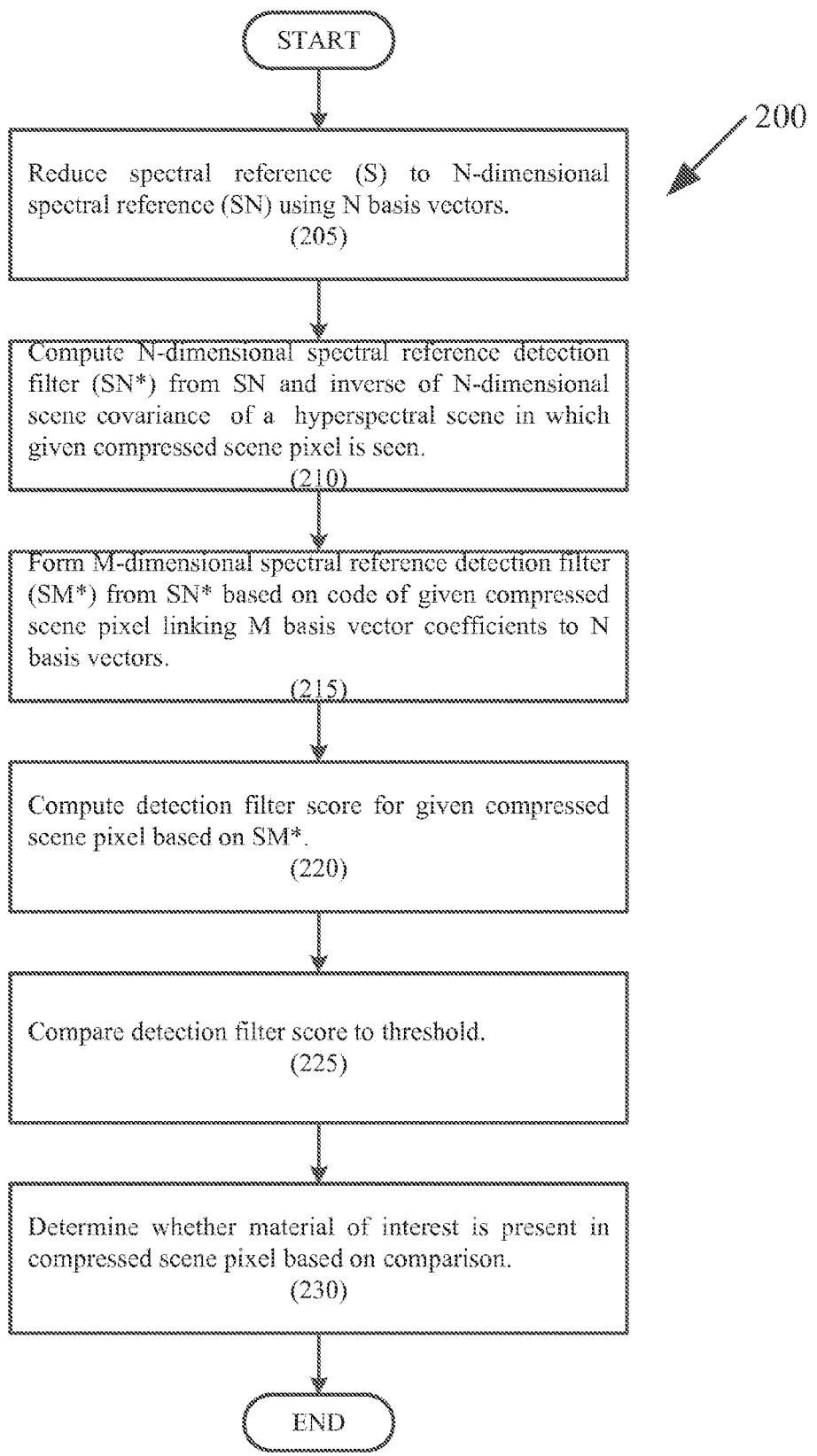
FIG. 3 is a flow chart of an example procedure performed by the detecting engine of FIGS. 2A-B.

FIG. 3 shows an example procedure 200 performed by the detecting engine 150 of FIG. 2. The detecting engine 150 is provided with a spectral reference and for a given compressed scene pixel, a set of M basis vector coefficients, set of N basis vectors, and code linking the M basis vector coefficients to the N basis vectors. The procedure 200 reduces (205) a spectral reference (S) to an N-dimensional spectral reference (SN) based on the set of N basis vectors.

The procedure 200 computes (210) an N-dimensional spectral reference detection filter (SN*) from the N-dimensional spectral reference (SN) and the inverse of an N-dimensional scene covariance (CN) of a hyperspectral scene in which the given compressed scene pixel is seen.

The procedure 200 forms (215) an M-dimensional spectral reference detection filter (SM*) from the N-dimensional spectral reference detection filter (SN*) based on the code of the given compressed scene pixel. The code links the M basis vector coefficients to the N basis vectors.

The procedure 200 computes (220) a detection filter score for the given compressed scene pixel based on the M-dimensional spectral reference detection filter (SM*). The detection filter score is indicative of a likelihood the spectrum of the given compressed scene pixel matches the spectrum of the spectral reference (S).

The procedure 200 compares (225) the detection filter score to a threshold.

The procedure 200 determines (230) whether the material of interest is present in the given compressed scene pixel and is a detection based on the comparison.

The above-described systems and methods can be implemented in digital electronic circuitry, in computer hardware, firmware, and/or software, e.g., in imaging system 102. The implementation can be as a computer program product (i.e., a computer program tangibly embodied in an information carrier medium). The implementation can, for example, be in a machine-readable storage device for execution by, or to control the operation of, data processing apparatus. The implementation can, for example, be a programmable processor, a computer, and/or multiple computers.

In one example, a computer program can be written in any form of programming language, including compiled and/or interpreted languages, and the computer program can be deployed in any form, including as a stand-alone program or as a subroutine, element, and/or other unit in image processor 100 suitable for use in a computing environment to carry out the features and functions of various examples discussed herein. A computer program can be deployed to be executed on one computer or on multiple computers at one site (e.g., in imaging system 102).

Method steps or operations can be performed as processes by one or more programmable processors executing a computer program to perform functions of various examples by operating on input data and generating output. Method steps can also be performed by and an apparatus can be implemented as special purpose logic circuitry. The circuitry can, for example, be a field programmable gate array (FPGA) and/or an application specific integrated circuit (ASIC). Modules, subroutines, and software agents can refer to portions of the computer program, the processor, the special circuitry, software, and/or hardware that implements that functionality.

Detecting engine 150 may comprise one or more processors suitable for the execution of a computer program include, by way of example, both general and special purpose microprocessors, and any one or more processors of any kind of digital computer. Generally, a processor receives instructions and data from a read-only memory or a random access memory or both. The elements of a computer may comprise a processor for executing instructions and one or more memory devices for storing instructions and data. Generally, a computer can include, can be operatively coupled to receive data from and/or transfer data to one or more mass storage devices (e.g., a memory module) for storing data (e.g., magnetic, magneto-optical disks, or optical disks). The memory may be a tangible non-transitory computer-readable storage medium having computer-readable instructions stored therein for processing images, which when executed by one or more processors (e.g., detecting engine 150) cause the one or more processors to carry out or implement the features and functionalities of various examples discussed herein.

Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computing device having a display device. The display device can, for example, be a cathode ray tube (CRT) and/or a liquid crystal display (LCD) monitor, and/or a light emitting diode (LED) monitor. The interaction with a user can, for example, be a display of information to the user and a keyboard and a pointing device (e.g., a mouse or a trackball) by which the user can provide input to the computing device (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described systems and techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computing device having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system may be coupled to and/or include clients and servers. A client and a server are generally remote from each other and typically interact through a communication network. The relationship of client and server arises by virtue of computer programs running on the respective computing devices and having a client-server relationship to each other.

Communication networks may include packet-based networks, which can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks may include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The computing device in imaging system 102 may include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., INTERNET EXPLORER® available from Microsoft Corporation, of Redmond, Wash.). The mobile computing device includes, for example, a BLACKBERRY® provided by Research In Motion Limited of Waterloo, Ontario, Canada.

"Comprise," "include," and/or plural forms of each are open ended and include the listed parts and can include additional parts that are not listed. "And/or" is open ended and includes one or more of the listed parts and combinations of the listed parts.

Although the above disclosure discusses what is currently considered to be a variety of useful examples, it is to be understood that such detail is solely for that purpose, and that the appended claims are not limited to the disclosed examples, but, on the contrary, are intended to cover modifications and equivalent arrangements that are within the spirit and scope of the appended claims.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for detecting the presence of materials of interest in a plurality of compressed scene pixels of a hyperspectral scene, the method comprising:

in a detecting engine, for a given compressed scene pixel having a set of M basis vector coefficients, a set of N basis vectors, and code linking the M basis vector coefficients to the N basis vectors, in which the value of M is less than or equal to the value of N:

reducing the spectral reference (S) to an N-dimensional spectral reference (SN) based on the set of N basis vectors, the spectral reference (S) representative of a material of interest and provided to the detecting engine;

computing an N-dimensional spectral reference detection filter (SN*) from the N-dimensional spectral reference (SN) and the inverse of an N-dimensional scene covariance (CN) of a hyperspectral scene in which the given compressed scene pixel is seen;

forming an M-dimensional spectral reference detection filter (SM*) by selecting M elements of the N-dimensional spectral reference detection filter (SN*) based on the code of the given compressed scene pixel linking the M basis vector coefficients to the N basis vectors;

computing a detection filter score for the given compressed scene pixel based on the M-dimensional spectral reference detection filter (SM*), the detection filter score being indicative of a likelihood the spectrum of the given compressed scene pixel matches the spectrum of the spectral reference (S);

comparing the detection filter score to a threshold; and determining, based on the comparison, whether the material of interest is present in the given compressed scene pixel and is a detection.

2. The method of claim 1 wherein computing the detection filter score includes computing a Matched Filter (MF) score in M dimensions for the given compressed scene pixel, or an Adaptive Cosine/Coherence Estimator (ACE) or Reed-Xiaoli (RX) filter score in M×N dimensions for the given compressed scene pixel.

3. The method of claim 1 wherein the detection that is determined based on the comparison is a candidate detection, the method further comprising:

computing a Matched Filter (MF), Adaptive Cosine/Coherence Estimator (ACE), other spectral filters or Reed-Xiaoli (RX) score in full dimensions or N dimensions for the candidate detection, the score being indicative of a likelihood the spectrum of the candidate detection matches the spectrum of the spectral reference (S);

comparing the MF, ACE, other spectral filters or RX score in full dimensions or N dimensions to a second threshold; and determining, based on the second comparison, whether the material of interest is present in the given compressed scene pixel and is a detection.

4. The method of claim 1 wherein computing the detection filter score includes computing a Matched Filter score in M dimensions (MFM) for the given compressed scene pixel and the method further comprising, when the compressed scene pixel is a detection based on the comparison of the MFM to the threshold:

computing a Adaptive Cosine/Coherence Estimator (ACE) or other spectral filters score in M or more dimensions, including full dimensions, for the compressed scene pixel;

comparing the ACE or other spectral filters score in M or more dimensions score to a second threshold; and determining, based on the second comparison, whether the material of interest is present in the given compressed scene pixel and is a detection.

5. The method of claim 1 wherein computing the N-dimensional spectral reference detection filter (SN*) includes multiplying the N-dimensional spectral reference (SN) with the inverse of the N-dimensional scene covariance (CN).

6. The method of claim 1 wherein forming the M-dimensional spectral reference detection filter (SM*) includes selecting M components from the N-dimensional spectral reference detection filter (SN*) based on the code linking M basis vector coefficients for the pixel to the N basis vectors.

7. The method of claim 1 further comprising computing the N-dimensional scene covariance (CN) based on a set of N basis vector coefficients provided to the detecting engine and associated with the set of N basis vectors of the given compressed scene pixel.

8. A system for detecting the presence of materials of interest in a plurality of compressed scene pixels of a hyperspectral scene, the system comprising:

a memory having computer executable instructions thereupon;

at least one interface receiving a spectral reference (S) representative of a materials of interest and, for a given compressed scene pixel, a set of M basis vector coefficients, a set of N basis vectors, and code linking the M basis vector coefficients to the N basis vectors, in which the value of M is less than or equal to the value of N;

a detecting engine coupled to the memory and the at least one interface, the computer executable instructions when executed by the detecting engine cause the detecting engine to:
reduce the spectral reference (S) to an N-dimensional spectral reference (SN) based on the set of N basis vectors;
compute an N-dimensional spectral reference detection filter (SN*) from the N-dimensional spectral reference (SN) and the inverse of an N-dimensional scene covariance (CN) of a hyperspectral scene in which the given compressed scene pixel is seen;
form an M-dimensional spectral reference detection filter (SM*) by selecting M elements of the N-dimensional spectral reference detection filter (SN*) based on the code of the given compressed scene pixel linking the M basis vector coefficients to the N basis vectors;
compute a detection filter score for the given compressed scene pixel based on the M-dimensional spectral reference detection filter (SM*), the detection filter score being indicative of a likelihood the spectrum of the given compressed scene pixel matches the spectrum of the spectral reference (S);
compare the detection filter score to a threshold; and
determine, based on the comparison, whether the material of interest is present in the given compressed scene pixel and is a detection.

9. A tangible non-transitory computer-readable storage medium having computer readable instructions stored therein for detecting the presence of materials of interest in a plurality of compressed scene pixels of a hyperspectral scene, which when executed by one or more processors cause the one or more processors, for a given compressed scene pixel having a set of M basis vector coefficients, a set of N basis vectors, and code linking the M basis vector coefficients to the N basis vectors, in which the value of M is less than or equal to the value of N, to:
reduce a spectral reference (S) to an N-dimensional spectral reference (SN) based on the set of N basis vectors, the spectral reference (S) representative of a materials of interest and provided to the detecting engine;
compute an N-dimensional spectral reference detection filter (SN*) from the N-dimensional spectral reference (SN) and the inverse of an N-dimensional scene covariance (CN) of a hyperspectral scene in which the given compressed scene pixel is seen;
form an M-dimensional spectral reference detection filter (SM*) from the N-dimensional spectral reference detection filter (SN*) based on the code of the given compressed scene pixel linking the M basis vector coefficients to the N basis vectors;
compute a detection filter score for the given compressed scene pixel based on the M-dimensional spectral reference detection filter (SM*), the detection filter score being indicative of a likelihood the spectrum of the given compressed scene pixel matches the spectrum of the spectral reference (S);
compare the detection filter score to a threshold; and
determine, based on the comparison, whether the material of interest is present in the given compressed scene pixel and is a detection.

\* \* \* \* \*